United States Patent [19]
Taniguchi et al.

[11] Patent Number: 5,726,559
[45] Date of Patent: Mar. 10, 1998

[54] SYNCHRONOUS ELECTRIC POWER GENERATING APPARATUS AND MAGNETIZATION CONTROL METHOD FOR THE SAME

[75] Inventors: Makoto Taniguchi, Obu; Atsushi Umeda, Anjo; Hirohide Sato, Toyokawa, all of Japan

[73] Assignee: Nippondenso Co., Ltd., Kariya, Japan

[21] Appl. No.: 627,479

[22] Filed: Apr. 4, 1996

[30] Foreign Application Priority Data

Apr. 24, 1995 [JP] Japan ................... 7-098245
Dec. 6, 1995 [JP] Japan ................... 7-317994

[51] Int. Cl.$^6$ ................................................ H02P 9/00
[52] U.S. Cl. ........................... 322/34; 322/28; 322/20
[58] Field of Search ................... 322/25, 26, 27, 322/28, 34

[56] References Cited

U.S. PATENT DOCUMENTS

| | | | |
|---|---|---|---|
| 5,177,677 | 1/1993 | Nakata et al. | 363/89 |
| 5,543,703 | 8/1996 | Kusase et al. | 322/16 |
| 5,550,456 | 8/1996 | Shekhawat et al. | 322/25 |
| 5,550,457 | 8/1996 | Kusase et al. | 322/29 |
| 5,561,363 | 10/1996 | Mashino et al. | 322/25 |
| 5,581,172 | 12/1996 | Iwatani et al. | 322/28 |

FOREIGN PATENT DOCUMENTS

| | | |
|---|---|---|
| 582 470 | 2/1994 | European Pat. Off. . |
| 51-140109 | 12/1976 | Japan . |
| 59-156200 | 9/1984 | Japan . |

*Primary Examiner*—Thomas M. Dougherty
*Assistant Examiner*—Nicholas Ponomarenko
*Attorney, Agent, or Firm*—Cushman, Darby & Cushman IP Group of Pillsbury, Madison & Sutro LLP

[57] ABSTRACT

In order to restrain increase in rotor temperature and reduction in field magnetic flux in an AC power generator, advanced-phase currents are supplied to stator windings of a stator via semiconductor switching devices by controlling the semiconductor switching devices during the power generating operation of the power generator. By this control, the advanced-phase currents will increase the field magnetic flux and, accordingly, increases in generated voltage. By reducing a field current to a field winding of a rotor by an amount corresponding to the increase in the power generation output, the temperature increase in the field winding can be reduced.

25 Claims, 12 Drawing Sheets

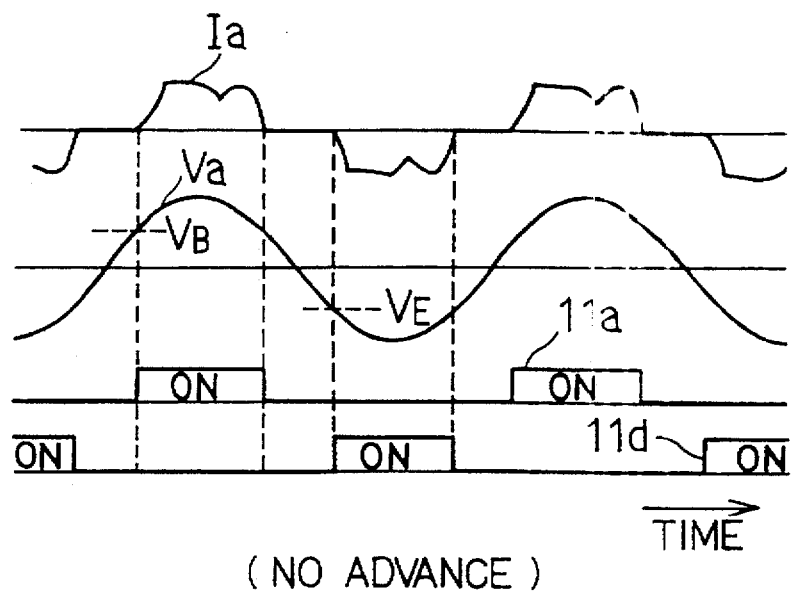
(NO ADVANCE)
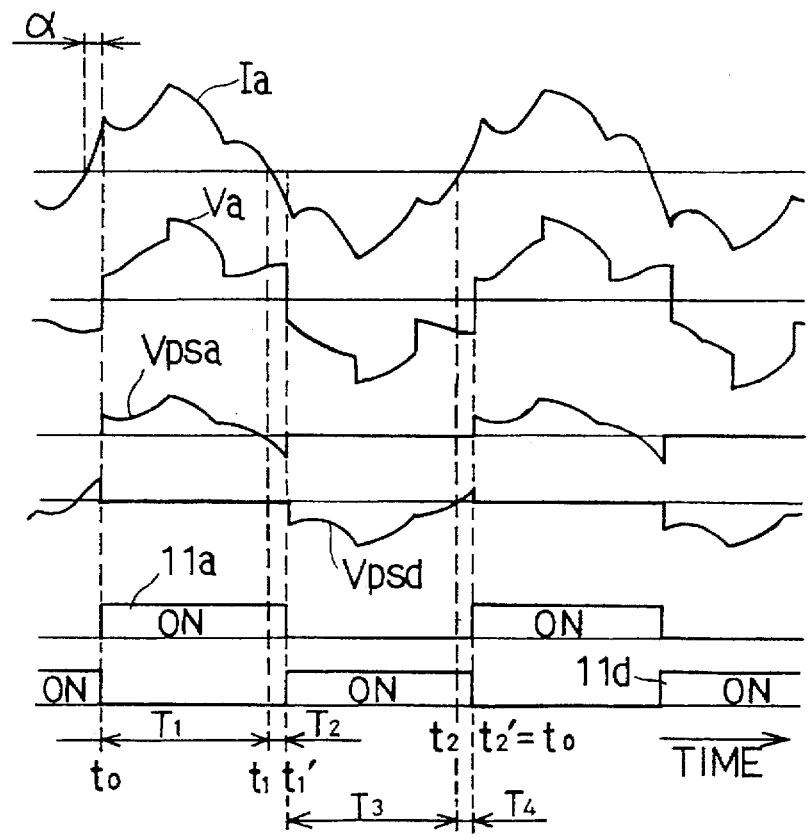

FIG. 11
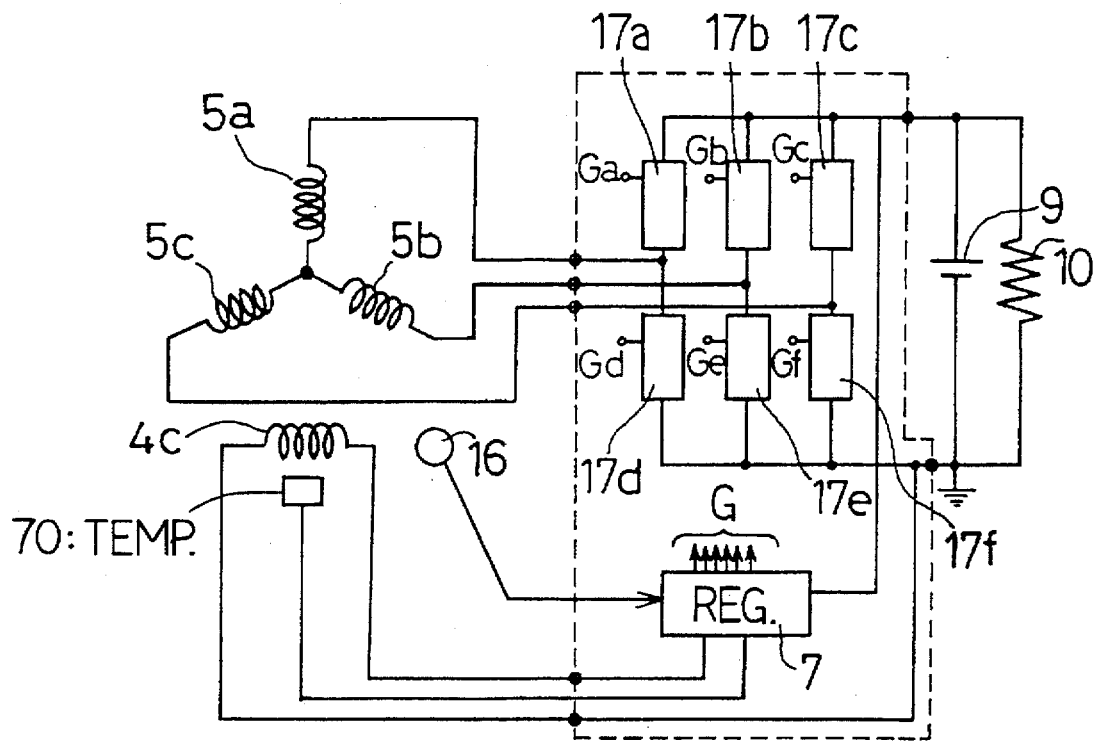
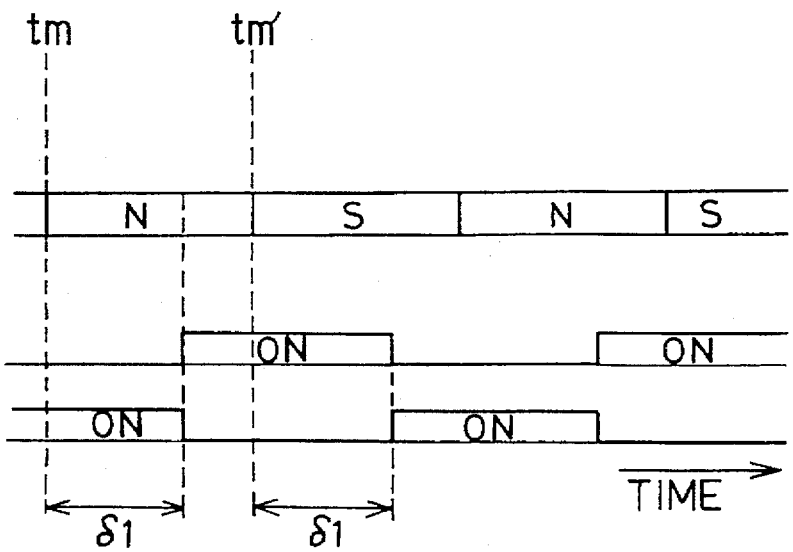
FIG. 12A
FIG. 12B
FIG. 12C

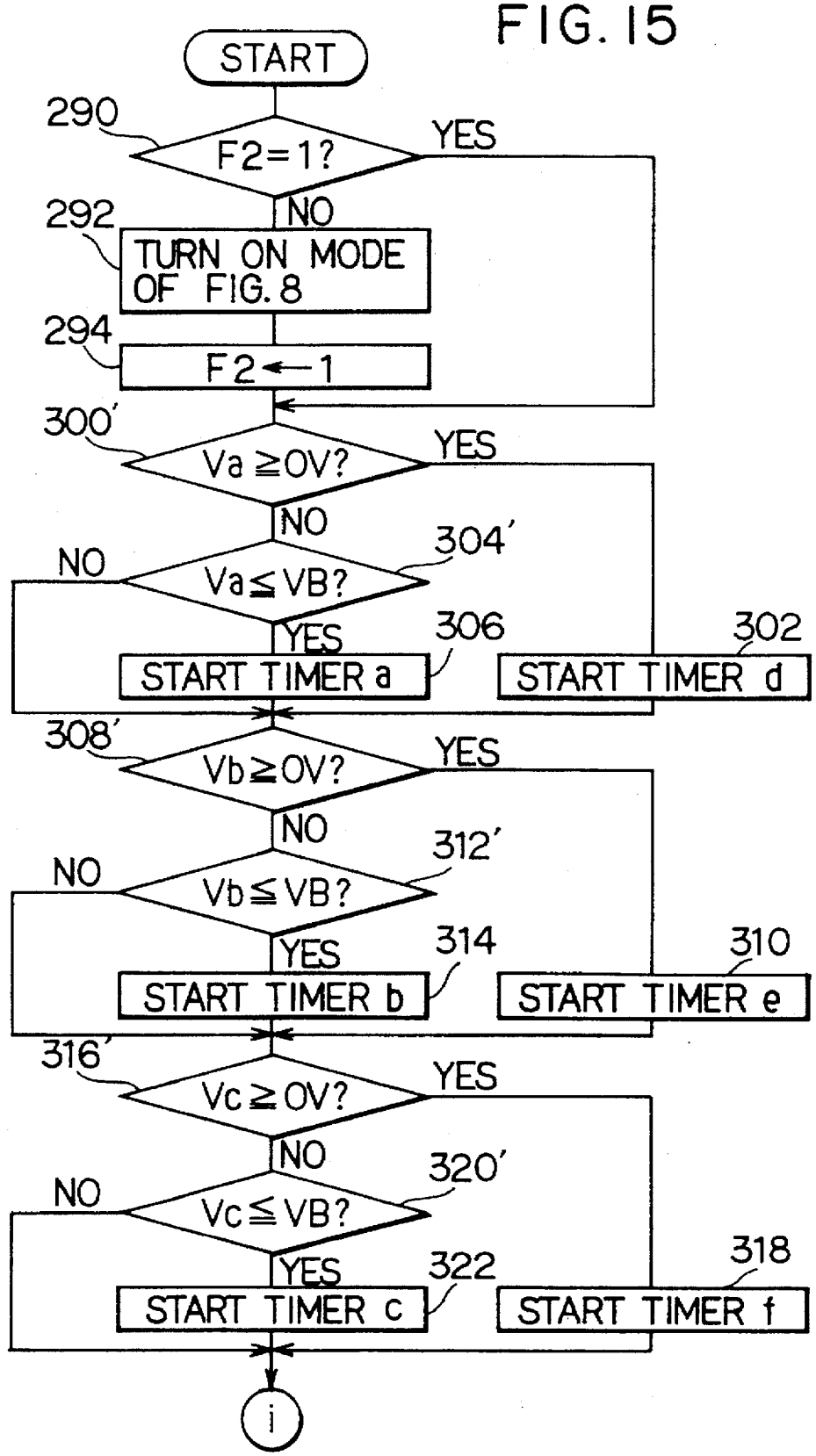

SYNCHRONOUS ELECTRIC POWER GENERATING APPARATUS AND MAGNETIZATION CONTROL METHOD FOR THE SAME

BACKGROUND OF THE INVENTION

1. Field of the Invention

The present invention relates to a synchronous power generating apparatus having a synchronous power generator and, more particularly, to a synchronous power generating apparatus that supplies advanced-phase current to stator windings of a synchronous power generator used, for instance, for vehicles, and a magnetization control method for the same.

2. Description of Related Art

A typical conventional power generating apparatus used, for instance, for vehicles, has a three-phase synchronous AC power generator (a so-called alternator). The apparatus uses a built-in three-phase full-wave rectifier to rectify voltages generated, and then charges a storage battery with the rectified voltage.

Along with today's trend of minimizing the engine room and increasing the equipment mounting density in the engine room, there is a tendency that the ambient temperature of the AC generator increases. In the AC generator having a field winding, the rotor is likely to fail to control a temperature increase of the field winding caused by heat generated by the field current in a low operating speed range which frequently occurs, that is, a range where the performance of cooling fans fixed to the rotor is still low. This may possibly reduce the field current, the generator power output and the durability of insulating resin.

This problem becomes critical particularly for size reduction and power output maximization of an AC generator having a Lundell-type rotor. Since a typical Lundell-type rotor has such a construction that the pole core substantially surrounds the field winding and prevents heat radiation therefrom, heat is confined in the field winding, resulting in a considerable temperature increase.

SUMMARY OF THE INVENTION

It is an object of the invention to provide a synchronous power generating apparatus and a magnetization control method that prevents a temperature increase of a rotor of field winding type and increases the power output.

It is another object of the present invention to provide a synchronous power generating apparatus and a magnetization control method that reduces the temperature rise of a field winding at low rotational speeds and assures a high power output at high rotational speeds.

According to one aspect of the invention, advanced-phase currents to stator windings, and a field current to a field winding, are supplied. Field magnetic flux (that is, rotating magnetic field) is enhanced by the advanced-phase currents in the low rotational speed range. In the high rotational speed range, the advanced-phase current supplied to the stator winding is reduced or discontinued to generate electric power by using the field flux mainly formed by the field current. As a result, the field current required for a given power generation output is reduced and the temperature increase of the field winding is suppressed in the low rotational speed range.

Preferably, the advanced-phase currents are supplied in such a direction as to flow into the stator windings by adjusting the conduction period during a rectification operation of semiconductor switching devices.

Preferably, for phase control of the advanced-phase currents, a rotational phase angle of the rotor is detected to control the timing of turning off the semiconductor switching devices.

Preferably, for the balance between the output increase and the heat generation increase, a boundary rotational speed between the low operational speed range and the high operational speed range is determined to a value twice to four times as high as the rising rotational speed (for example, 500 rpm–1000 rpm) at which the generated voltage exceeds a predetermined battery voltage.

Preferably, the temperature of the field winding is detected to increase the advanced-phase currents and the decrease field current when the temperature is high than when the temperature is low, so that the temperature of the field winding can be reduced while the reduction of the output current is restrained.

According to another aspect of the invention, a physical quantity related to armature currents generated by a synchronous power generator is detected. Based on the detected quantity, a two-way conduction switching circuit having high-side switches and low-side switches controls a start time point and an end time point of advanced-phase currents supplied to the stator windings.

Preferably, the high-side switches are turned off after a predetermined length of time from when the currents through the high-side switches shift from such a direction as to flow out to such a direction as to flow in.

Preferably, the low-side switches are turned off after a predetermined length of time from when the current through the low-side switches shift from such a direction as to flow into the stator windings to such a direction as to flow out of the stator windings.

BRIEF DESCRIPTION OF THE DRAWINGS

FIGS. 4A–4D are timing charts indicating on-timings of Si-MOSFETs shown in FIG. 1 when a no phase advancement control is performed;

FIGS. 5A–5F are timing charts indicating on-timings of Si-MOSFETs shown in FIG. 1 when a phase advancement control is performed;

FIG. 11 is a block circuit diagram of a power generating apparatus according to Embodiment 2 of the present invention;

FIGS. 12A–12C are timing charts indicating on-timings of Si-MOSFETs shown in FIG. 11 when a phase advancement control is performed;

FIG. 15 is a flowchart illustrating a routine for executing a phase advancement mode according to Embodiment 3.

DETAILED DESCRIPTION OF PRESENTLY PREFERRED EMBODIMENTS (Embodiment 1)

An embodiment of a synchronous power generating apparatus of the present invention will be described with reference to a block diagram shown in FIG. 1 and a sectional view of a three-phase synchronous power generator 100 shown in FIG. 2.

Figure 1:
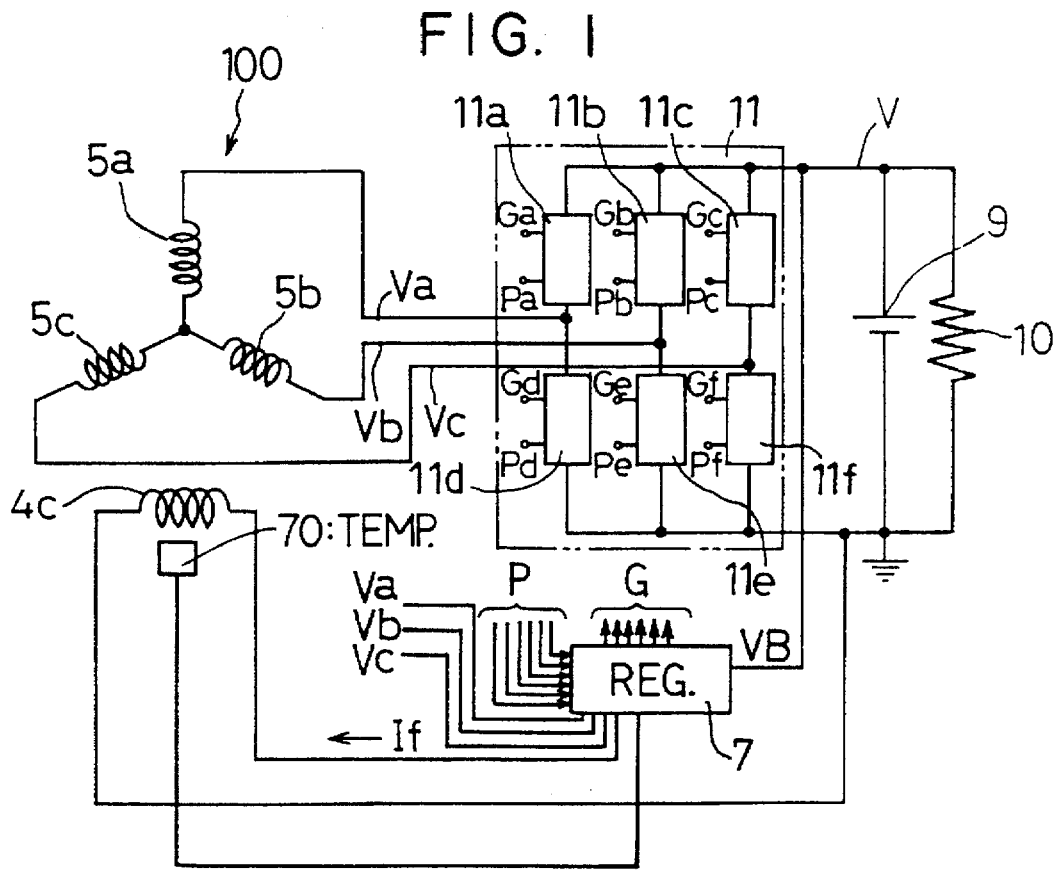
FIG. 1 is a block diagram of a power generating apparatus according to Embodiment 1 of the present invention.

This synchronous power generating apparatus which is used, for instance, for vehicles, has a three-phase synchronous power generator (AC generator or alternator) 100, a three-phase full-wave rectifier (also referred to as inverter) for rectifying the AC currents generated, and a regulator 7, as shown in FIG. 1. The three-phase full-wave rectifier 11 and the regulator 7 constitute the advanced-phase current supplying means (control means).

Figure 2:
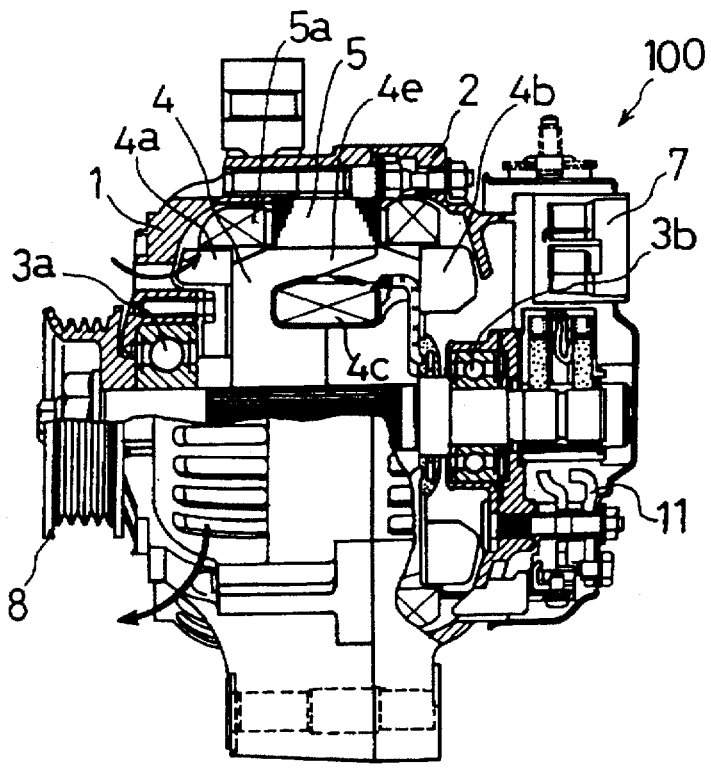
FIG. 2 is a sectional view of a three-phase synchronous power generator shown in FIG. 1.

The three-phase synchronous power generator 100 has a drive frame 1 and a rear frame 2 that rotatably support a rotor 4 by bearings 3a, 3b as shown in FIG. 2. A stator 5 is fixed to the drive frame 1, surrounding an outer peripheral surface of the rotor 4. The armature currents Ia–Ic generated in stator windings (armature windings of a–c phases) 5a–5c of the stator 5 are rectified by the rectifier 11 composed of MOSFETs. The field current supplied to a field winding 4c of the rotor 4 is controlled by the regulator 7. Cooling fans 4a, 4b are mounted to the opposite side ends of a pole core 4e of the rotor 4.

As well known, in the three-phase synchronous power generator 100, a field current If is supplied to the field winding 4c and the rotor 4 is rotated by an engine (not shown) via a pulley 8 to produce a rotating magnetic field over an inner periphery of the stator 5 so that three-phase AC voltages are induced in the armature windings 5a–5c.

The three-phase full-wave rectifier 11 comprises an inverter circuit in which Si-MOSFETs 11a–11f are connected in a three-phase bridge configuration. The three-phase full-wave rectifier 11 is well known and description of its construction will be omitted for brevity. A high-level DC output terminal of the three-phase full-wave rectifier 11 is connected to the high-level terminal of a battery 9 and to a positive terminal of an electric load 10. A low-level DC output terminal of the three-phase full-wave rectifier 11 is grounded together with the low-level terminal of the battery 9 and the other terminal of the electric load 10. Instead of the Si-MOSFETs, the MOSFETs may be formed from a SiC material, a compound of Si and C. Such MOSFETs can be used at high temperature so that the cooling fans 4a, 4b can be reduced in size.

The regulator 7, having a microcomputer arrangement, PWM-controls the conduction rate of the field current If so that the battery voltage VB accords with a predetermined value of generated voltages, and generates gate control signal voltages Ga–Gf based on voltage drop signals Pa–Pf (described later) individually supplied from the Si-MOSFETs 11a–11f, and applies the gate control signal voltages Ga–Gf individually to gates of the Si-MOSFETs 11a–11f. A reference numeral 70 denotes a field temperature detector mounted in the generator 100 for detecting a temperature and producing a signal corresponding to the temperature of the field winding 4c.

The operational mechanism of the embodiment will be briefly described.

According to this embodiment, the regulator 7 outputs the gate voltage signals Ga–Gf to the rectifier 11 at predetermined timings (described later) so that advanced-phase current will flow through the stator windings 5a–5c. The advanced-phase currents cause armature reaction, magnetizing effect, and thus result in an increase of the field magnetic flux. The voltages generated and the output currents are thus increased. Furthermore, the field current is reduced by the amount corresponding to the output increase, so as to reduce the heat generation of the field winding 4c. The temperature increase of the rotor winding 4c is thereby restrained without reducing the power output.

Figure 3:
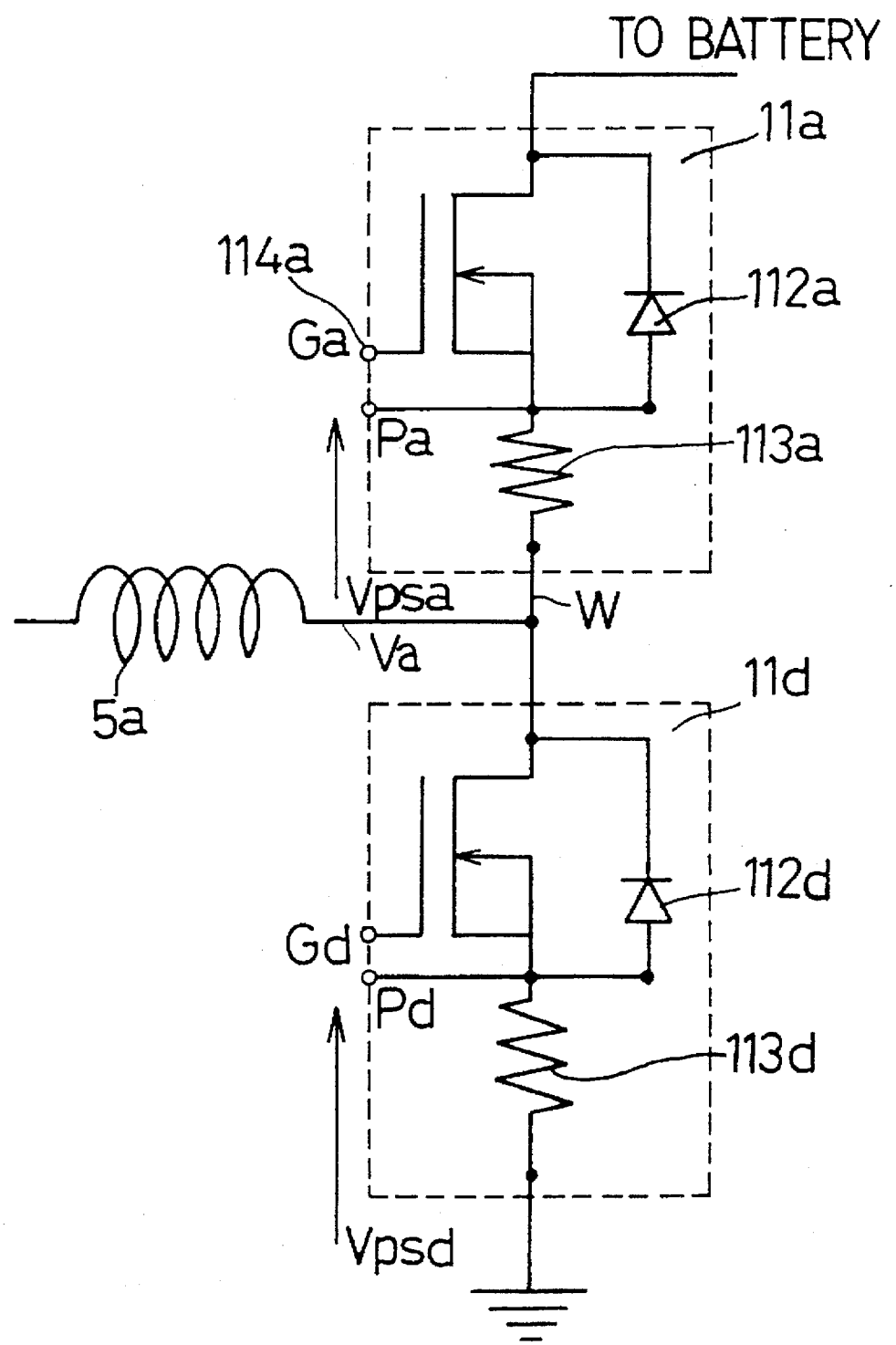
FIG. 3 is an equivalent circuit diagram illustrating a portion of one phase of a three-phase full-wave rectifier shown in FIG. 1.

An inverter circuit of the a-phase of the three-phase full-wave rectifier 11 will be described with reference to FIG. 3.

The high-side switch Si-MOSFET 11a and the low-side switch Si-MOSFET 11d are of N-channel type and interconnected in series. The Si-MOSFET 11a has an N-type region formed at the armature winding side, that is, the drain region during power generation, and another N-type region formed at the battery side, that is, the source region during the power generation, and a P well region formed immediately under the gate electrode 114a. The PN junction between the P well region and the N-type regions forms a parasitic diode 112a.

According to this embodiment, the P well region immediately under the channel of the Si-MOSFET 11a is short-circuited to the N-type region provided at the armature winding side in order to set electric potential of the P well. The N-type region provided at the armature winding side is connected to the armature winding 5a via a low-resistance resistor 113a for detecting current. The low-resistance resistor 113a is formed by patterning a metallization layer or a semiconductor layer having a predetermined resistance on top of a chip by using an insulating film.

Similarly, the P well region immediately under the channel of the Si-MOSFET 11d is short-circuited to the ground-side N-type region in order to set electric potential of the P well. The ground-side N-type region is grounded via a low-resistance resistor 113d for detecting current. The Si-MOSFETs 11b, 11e, 11c, 11f of the other phases have similar low-resistance resistors. The Si-MOSFETs 11a–11f have connecting terminals Pa–Pf, respectively, for connection between the low-resistance resistors and the N-type regions provided at the armature winding side. The parasitic diodes 112a, 112d also serve as current path for supplying the generated current to the battery 9.

Thus, the channel current occurring when the Si-MOSFET 11a is turned on can be detected on the basis of a difference between the phase voltage Va and the potential of the connecting terminal Pa. The channel current of each of the Si-MOSFETs 11g–11f can be detected in the similar manner. The gate voltages are made sufficiently high, and the Si-MOSFETs 11a–11f are operated in unsaturated operating region (that is, operating mode in which the channel is not pinched off by a depletion layer).

The switching timings of the Si-MOSFETs 11a–11f of the three-phase full-wave rectifier 11 will next be described.

(When Advanced-phase Current Is Not Supplied)

First, the operation in a case where the advanced-phase current is not supplied will be described. FIGS. 4A–4D show timing charts of the phase voltage Va of the armature winding 5a.

The Si-MOSFET 11a acting as the high-side switch of the a-phase that outputs the phase voltage Va is controlled as follows. It is examined whether the phase voltage Va of the armature winding 5a is higher than the battery voltage VB and the other phase voltages Vb, Vc. If the phase voltage Va is higher, the Si-MOSFET 11a is turned on (closed). The Si-MOSFET 11a is turned off (opened) when the phase voltage Va becomes lower than the battery voltage VB. The switching of the other high-side switches, the Si-MOSFETs 11b, 11c, is controlled in generally the same manner.

The Si-MOSFET 11d serving as the a-phase low-side switch is controlled as follows. It is examined whether the phase voltage Va of the armature winding 5a is lower than the ground voltage VE (=0 V) and the other phase voltages Vb, Vc. If the phase voltage Va is lower, the Si-MOSFET 11d is turned on. The Si-MOSFET 11d is turned off when the phase voltage 11a becomes higher than the ground voltage. The switching of the other low-side switches, the Si-MOSFETs 11e, 11f, is controlled in generally the same manner.

(When Advanced-phase Current Is Supplied)

The operation in the case where advanced-phase current is supplied will be described. FIGS. 5A–5F show timing charts of the phase voltage Va of the armature winding 5a.

According to this embodiment, the high-side switch Si-MOSFET 11a is turned on (FIG. 5E) at a time point $t_2'$ (=$t_0$), that is, after time $T_4$ (=$T_2$) from a time point $t_2$ when the phase current Ia (FIG. 5A) changes from negative to positive, that is, when the voltage drop Vpsd (FIG. 5D) across the low-resistance resistor 113d changes from negative to positive. The other high-side switches Si-MOSFETs 11b, 11c are turned on at the timings determined in generally the same manner. The low-side switch Si-MOSFET 11d is turned on (FIG. 5F) at a time point $t_1'$, that is, after time $T_2$ from a time point $t_2$ when the phase current Ia changes from positive to negative, that is, when the voltage drop Vpsa (FIG. 5C) across the low-resistance resistor 113a changes from positive to negative. The other low-side switches Si-MOSFETs 11e, 11f are turned on at the timing determined in generally the same manner.

On the other hand, the timing of turning off each of the Si-MOSFETs 11a–11f continues about 180° phase duration from the turning-on timing, according to this embodiment. That is, the turning off of the Si-MOSFET 11a is performed simultaneously with or immediately before the turning on of the Si-MOSFET 11d, and the turning off of the Si-MOSFET 11d is performed simultaneously with or immediately before the turning on of the Si-MOSFET 11a.

The delay ($T_2=T_4$) of the tuning-off timing provides supply of advanced-phase current component from the battery 9 to the armature windings 5a, 5b, 5c, and thereby enhances the field magnetic flux. For example, the turning off of the Si-MOSFET 11a is not performed at $t_1$ but delayed by the duration $T_2$ as indicated in FIG. 5E. Similarly, the turning off of the Si-MOSFET 11d is delayed to $t_2'$, that is, the time $T_4$ (=$T_2$) following $t_2$.

This operation achieves supply of current from the battery 9 to the armature windings 5a–5c, thereby supplying the stator windings 5a with a current advanced in phase by α (see FIG. 5A) that provides magnetization enhancement. The sum of the recharging duration T1 (=T3) and the turning-off delay duration T2 needs to be an electric angle of 180° or less. The three-phase phase advancement control can be achieved by delaying the b-phase by an electric angle of 120° and advancing the c-phase by an electric angle of 120°.

The increased field magnetic flux must be returned to the normal state by control to reduce the field current if. This control is performed by monitoring the battery voltage VB and the field winding temperature θr.

This embodiment performs the control by detecting the phase voltage Va, and calculating the rotational speed of the rotor based on the frequency of the phase voltage Va, and if the rotational speed is within such a range that the control is required, reducing the duty ratio of a switching transistor (not shown) for switching the field current If to reduce the field current If in accordance with increases of the field winding temperature θr.

Simultaneously, the delay duration T2 (=T4) is increased as the battery voltage VB decreases. For this operation, the duration when the switching devices are on must be an electric angle of 180° or less. According to this embodiment, the turn-on duration is 180°. This control is continued until the field winding temperature θr and the battery voltage VB become stable.

On the other hand, if the calculated rotational speed is in such a range that the control is not required, the non-phase advance control mode (a control mode in which the delay durations T2, T4 are set to an electric angle of 0°) is set, and the control is switched to the normal field current control (FIGS. 4A–4D) based on the battery voltage VB.

The above-described operation is summarized as follows.

The phase current, that is, the advanced-phase current, flows in such direction as to flow into the stator winding 5a for the predetermined length of time (for example, $T_2$ indicated in FIG. 5A). The phase voltage Va (the phase voltage referring to the electric potential of the output terminal of the stator winding 5a of that phase) has not reversed in this length of time. That is, the phase current Ia is reversed earlier than the phase voltage Va and the phase of the current Ia is accordingly advanced with respect to the phase of voltage Va, thus increasing the field magnetic flux.

If the advanced-phase current is not provided at time point $t_1'$ when the predetermined length of time $T_2$ has elapsed, the phase voltage Va normally becomes higher than the voltage of the low-level DC power source terminal (0 V in FIG. 1). Without conduction of the advanced-phase current, the phase current Ia (the advanced phase) will not flow from the low-level DC power source into the stator winding after the time point $t_1'$.

However, the advanced-phase current is allowed to flow from the high-side switch 11a into the stator winding 5a during the predetermined length of time T2, the turning off of the high-side switches 11a at the time point of t1' causes a counter electromotive force in the stator winding of each phase in such a direction as to reduce the potential of the output terminal of the stator winding 5a of the phase, that is, the phase voltage Va of the phase. The phase voltage is reduced by the level of the counter electromotive force, that is, the phase voltage Va is reduced below the potential of the low-level DC power source terminal. As a result, advanced-phase current flows from the low-level DC power source terminal into the stator winding of that phase, via the closed low-side switch or a diode of the low side connected in parallel with that low-side switch.

In other words, it is considered that the advanced-phase current, which does not occur during the advanced-phase current non-supply mode, flows during the predetermined time $T_2$ so that electromagnetic energy is accumulated in the stator winding, and then the electromagnetic energy is released after the time point t¹'. Since the advanced-phase current occurring after the time point t1' also distorts the current waveform toward the phase-advanced state, the resultant advanced-phase current increases the field magnetic flux. In addition, the advanced-phase current after the time point t1' is actually recovered from the high-level DC power source terminal.

By comparing the case achieved by the non-phase advancement control mode indicated in FIGS. 4A–4D and the case achieved by the phase advancement control mode indicated in FIGS. 5A–5F, it should be understood that the conduction of advanced-phase current for the predetermined length of time $T_2$ increases the field magnetic flux effective for power generation and increases the duration of current conduction from the stator winding to the high-level DC power source terminal during one period, thus increasing the power generation capacity.

It should be easily understood that the maximum value of the aforementioned predetermined length of time (the advanced-phase current supply duration) is the maximum duration (maximum delay time) dependent on the rotational speed. It should also be apparent that the maximum delay time varies substantially in inverse proportion to variation of the rotational speed since the period (electrical angle of $2\pi$) of the armature current of each phase varies depending on the rotational speed. Furthermore, since the rising of the generated voltage of each phase becomes quicker with increases of rotational speed, an increase in the rotational speed will further reduce the maximum delay time. Therefore, a map defining the relation between the maximum delay time and the rotational speed may be stored in the control circuit beforehand, so that when a rotational speed is introduced into the control circuit, the maximum delay time corresponding to the rotational speed can be determined, and so that if a delay time calculated exceeds the maximum delay time, the delay time can be fixed to the maximum delay time.

Figure 6:
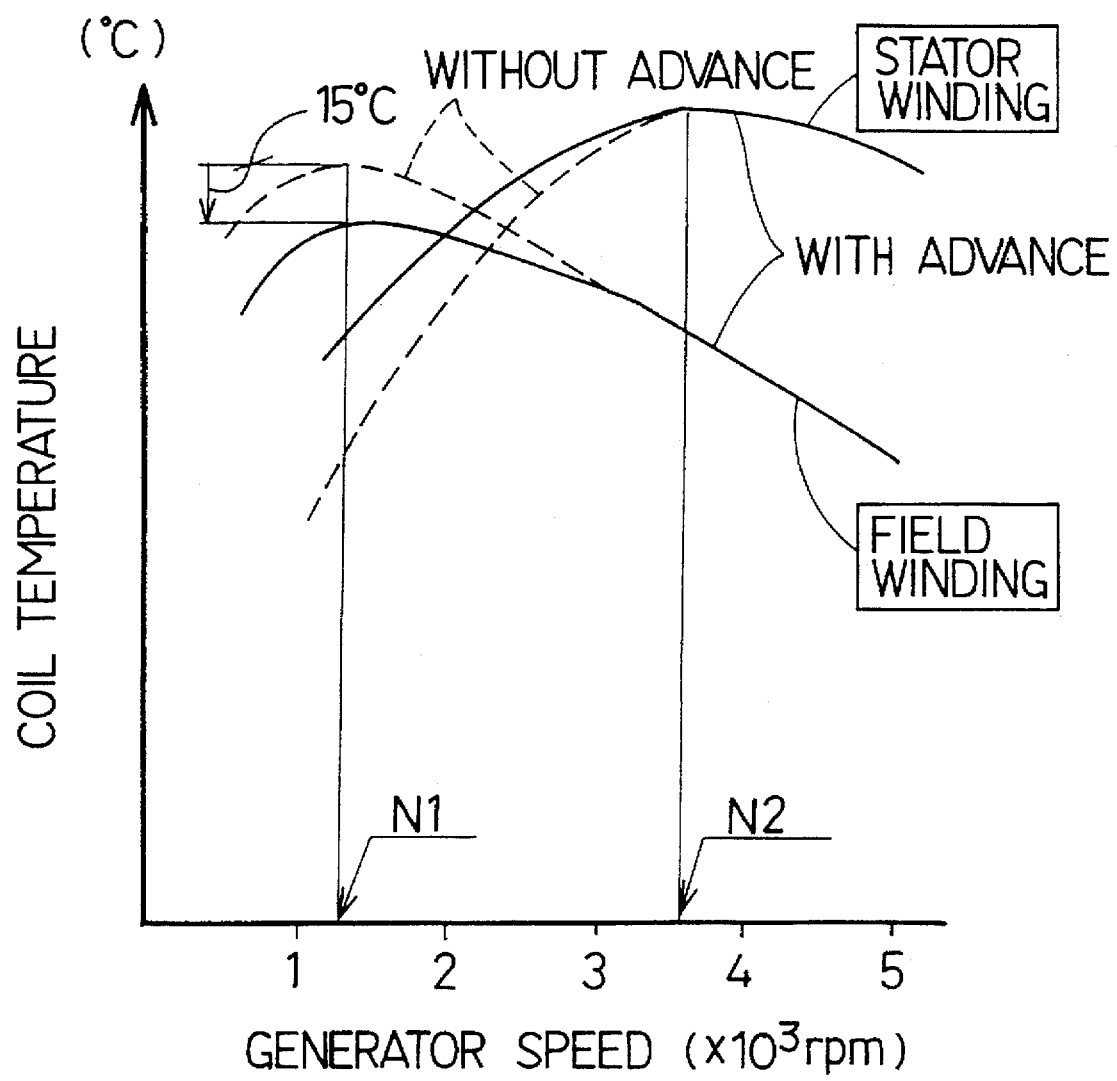
FIG. 6 is an experimentally obtained graph indicating the relation between alternator rotational speed and field winding temperature and the winding temperature.

Thus, this control reduces the temperature of the field winding 4c without causing output reduction, thus solving problems with insulation deterioration. FIG. 6 shows an experimental result according to this embodiment. As indicate in in FIG. 6, the temperature of the field winding 4c was reduced by about 15° C. The phase advancement control and the non-phase advancement control are performed by controlling the timing of the switching instruction voltage from the regulator 7 to the gate electrode of each of the Si-MOSFETs 11a–11f.

Although the temperature of the stator windings 5a–5c is increased by a phase current increase caused by the advanced-phase current as a result of the aforementioned control, this temperature increase causes no substantial problems. Since the rotational speed N2 at which the temperature of the stator windings 5a–5c reaches a peak is higher than the rotational speed N1 at which the temperature of the field winding 4c reaches a peak, there is an ample margin in the heat resistance of the insulation materials of the stator windings 5a–5c in a rotational speed range where the temperature of the field winding 4c becomes critical. On the other hand, at the rotational speed N2 at which the temperature of the stator windings 5a–5c reaches the peak, sufficient amount of cooling air stream is provided by the fans 4a and 4b so that the temperature increase remains at a conventional level even if the field current If is returned to the normal state. According to this embodiment, the control to supply the advanced-phase current and reduce the field current is performed in a range up to 3000 rpm. The boundary rotational speed for allowing the phase advance control to be performed may be determined to, for example, a value twice to four times as high as the rising rotational speed (500–1500 rpm) at which the generated voltage exceeds the predetermined battery voltage (normally, 13.5 V). This value may be determined considering the balance between the output increase and the heat generation increase. In addition, the advanced-phase current supply may be discontinued if the field winding temperature θr is equal to or less than a predetermined value (for example, 170° C.).

The control process according to Embodiment 1 will be described in detail with reference to a flowchart shown in FIG. 7. The control illustrated by the flowchart is carried out by the regulator 7.

The regulator 7 causes operation in the non-phase advancement mode and detects the voltage of each phase Va–Vc (step 101), and calculates a rotational speed N based on the voltages (or waveforms). It is then determined whether the phase advancement control is needed (step 104) on the basis of the rotational speed calculated, more specifically, depending on whether the rotational speed is equal to or less than a predetermined threshold rotational speed. If the rotational speed is equal to or less than the threshold, it is determined that the phase advancement control is needed and the operation proceeds to step 105 to read a maximum delay duration (longest advanced-phase current supply duration) Tmax from a map on the basis of the rotational speed. Then, the regulator 7 detects a field winding temperature θr (step 106), and reduces the field current If to a predetermined value if the field winding temperature θr is greater than the aforementioned predetermined value (steps 108, 110). Then, the regulator 7 detects the battery voltage VB (step 112). If VB is lower than a predetermined value (for example, 13.5 V), the regulator 7 increases the delay duration T2=T4 by a small constant value ΔT (steps 114, 116), and the operation then proceeds to step 130. If VB equals or exceeds the predetermined value, the regulator 7 sets the non-phase advancement mode active (step 118) and then returns to step t01.

Step 130 examines whether the present value of the delay duration $T_2=T_4$ is greater than the maximum delay duration Tmax. If it is not greater, the operation returns to step 101. If the present value is greater than the maximum delay duration Tmax, the regulator 7 sets the delay duration T2=T4 to the maximum delay duration Tmax (step 132), and sets the phase advancement mode active (step 134), and then returns to step 101.

On the other hand, if step 104 determines that the phase advancement control is not needed, the regulator 7 sets the non-phase advancement control mode (a control mode in which the delay durations T2, T4 are controlled to an electric angle of 0°) active (step 120), and switches to the normal field current control on the basis of the battery voltage VB (steps 122, 124, 126).

The non-phase advancement mode can also be performed by turning off all the MOSFETs 11a–11f to allow the three-phase full-wave rectification by the parasitic diodes 112a–112f of the MOSFETs while achieving substantially the same effects.

Although this embodiment detects the field winding temperature and the battery voltage and performs the control based on the detected values, substantially the same effect can be achieved by providing beforehand information in the form of a map wherein the delay durations T2, T4 and the field current If are determined by calculation such that the increase of the field winding temperature will be minimum at respective rotational speeds.

A subroutine for conducting the non-phase advancement mode will be described with reference to a flowchart shown in FIG. 8. The subroutine is executed by interrupting at a predetermined interval if the non-phase advancement mode is selected by the routine illustrated in FIG. 7.

The subroutine is executed by first examining whether the phase voltage Va of an a-phase is greater than the battery voltage VB (step 200). If it is greater, the high-side switch 11a is turned on (step 202). If Va is equal to or less than VB, the high-side switch 11a is turned off (step 204). Then, it is examined whether the phase voltage Va of a-phase is lower than the electric potential of the low-level terminal of the battery, that is, 0 V (step 206). If it is lower, the low-side switch 11d is turned on (step 208). If Va is not lower than 0 V, the low-side switch 11d is turned off (step 210).

Subsequently, it is examined whether the phase voltage Vb of a b-phase is greater than the battery voltage VB (step 212). If it is greater, the high-side switch 11b is turned on (step 214). If Vb is equal to or lower than VB, the high-side switch 11b is turned off (step 216). Then, it is examined whether the phase voltage Vb of the b-phase is lower than 0 V, that is, the potential of the battery low-level terminal (step 218). If it is lower, the low-side switch 11e is turned on (step 220). If it is not lower than 0 V, the low-side switch 11e is turned off (step 222).

Then, it is examined whether the phase voltage Vc of a c-phase is greater than the battery voltage VB (step 224). If the voltage Vb is greater, the high-side switch 11c is turned on (step 226). If it is equal to or lower than VB, the high-side switch 11c is turned off (step 228). Then, it is examined whether the phase voltage Vc of the c-phase is lower than 0 V, that is, the potential of the battery low-level terminal (step 230). If it is lower, the low-side switch 11f is turned on (step 232). If it is not lower than 0 V, the low-side switch 11f is turned off (step 234). The operation then returns to the main routine (FIG. 7).

A subroutine for executing the phase advance control mode will be described with reference to FIGS. 9 and 10. The subroutine is executed by interrupting at a predetermined interval if the phase advancement mode is selected in step 134 of the routine illustrated in FIG. 7.

Figure 9:
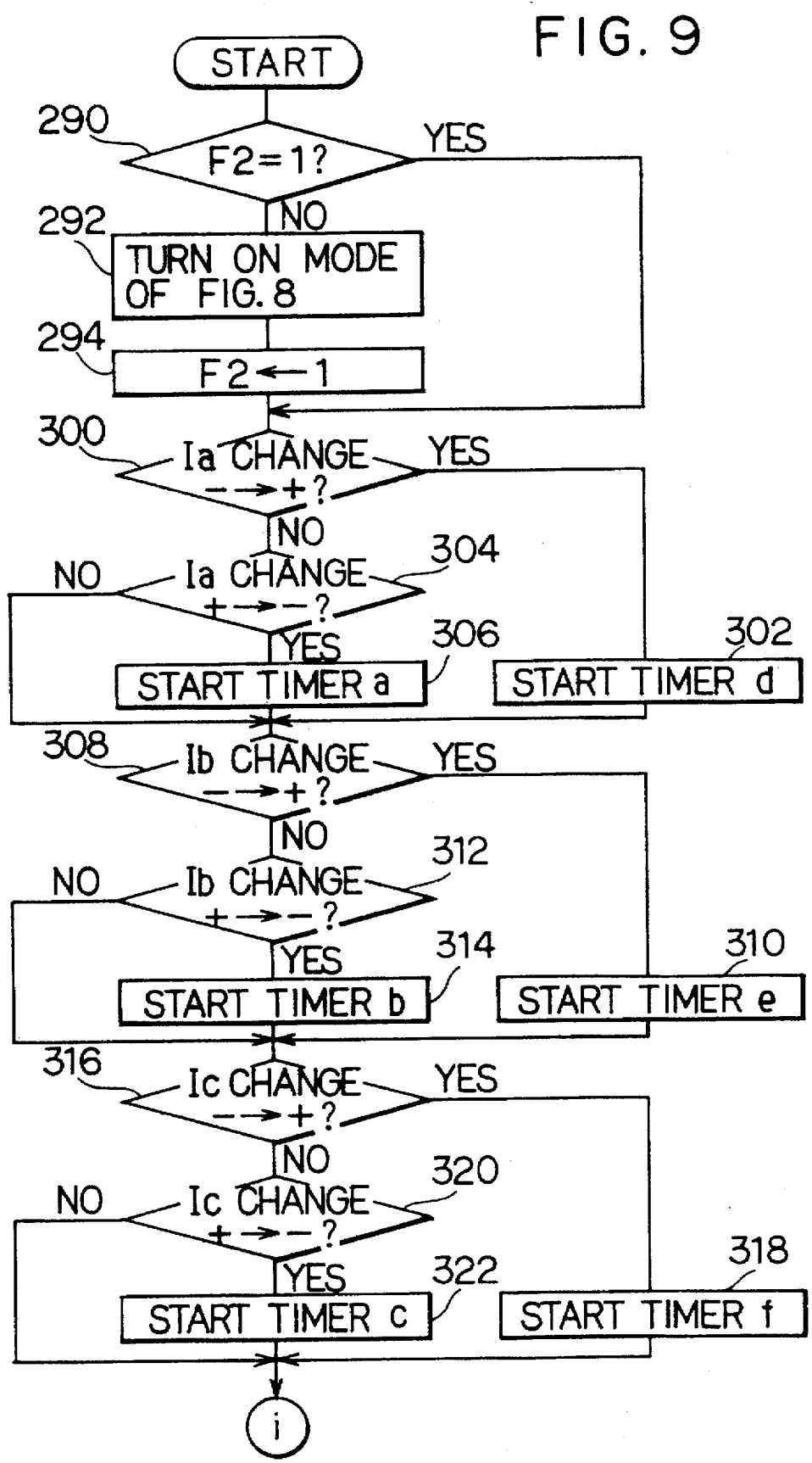
FIG. 9 is a flowchart illustrating a routine for executing the phase advancement mode according to Embodiment 1.
Figure 10:
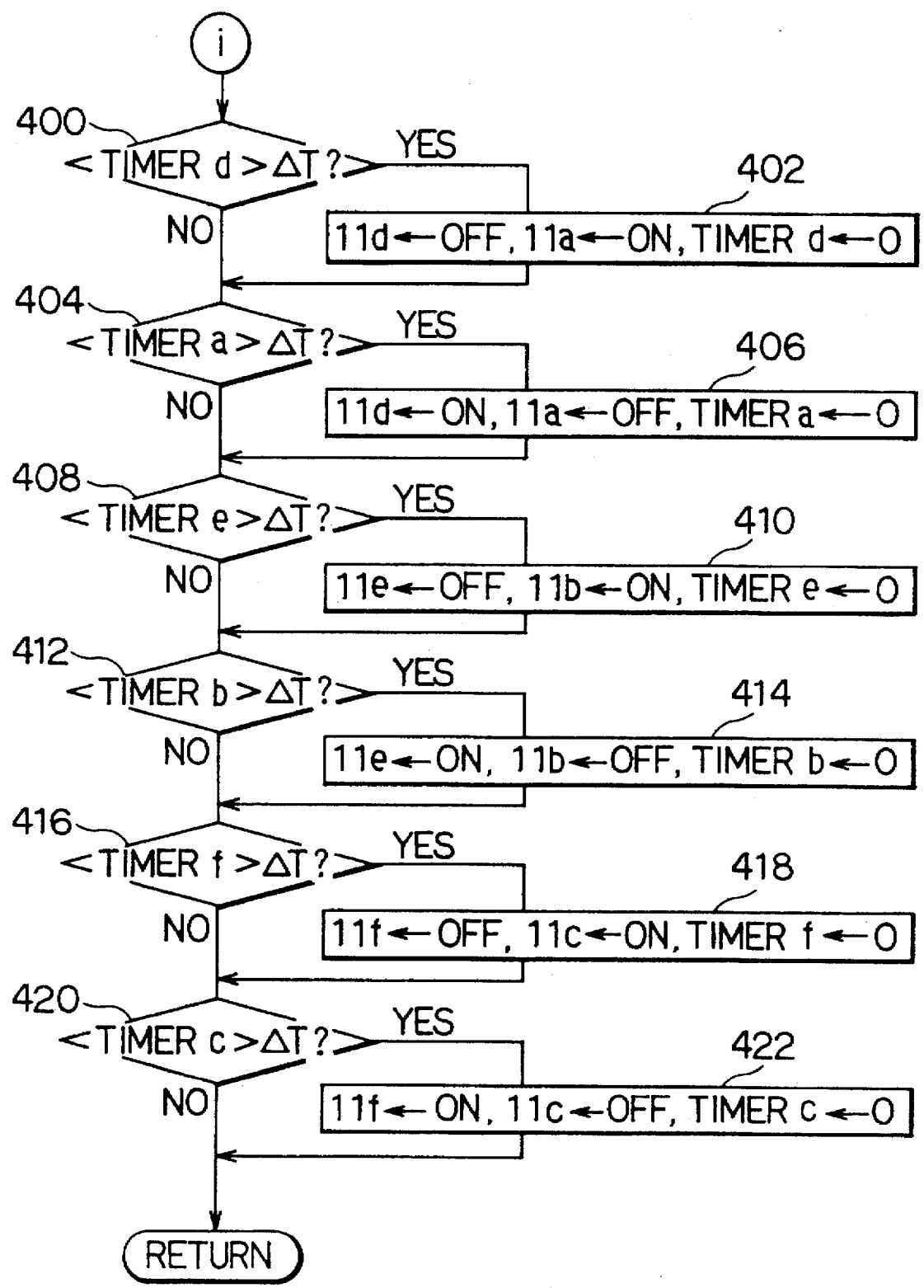
FIG. 10 is a flowchart illustrating a routine for executing the phase advancement mode according to Embodiment 1.

FIG. 9 illustrates the routine for determining a zero crossing point. FIG. 10 illustrates the routine for controlling the switching operation of the MOSFETs 11a–11f.

First, it is examined whether a flag F2 has been set to 1 indicating whether this routine is going to be performed for the first time or has been performed once or more (step 290). If this routine has been performed once or more (F2=1), the operation jumps to step 300. If this routine is going to be performed for the first time (F2=0), only the energization (turning on) of the Si-MOSFETs 11a–11f is performed according to the routine illustrated in FIG. 8 (step 292). After setting the flag F2 to 1 (step 294), the operation proceeds to step 300. The flag F2 is reset to 0 when application of the battery voltage is started.

Step 300 examines whether during closure of the low-side switch 11d, the current through the low-side switch 11d, that is, the armature current Ia, has changed from negative to positive, that is, from the direction in which current flows into the stator winding 5a to the direction in which current flows out into the low-side DC power terminal (0 V). If the current direction has changed, a built-in timer d is started (step 302). If it has not changed, it is examined whether during closure of the high-side switch 11a, the current through the high-side switch 11a, that is, the armature current Ia, has changed from positive to negative, that is, from the direction in which current flows out of the stator winding 5a into the high-side DC power terminal to the direction in which current flows into the stator winding 5a (step 304). If the current direction has changed, a built-in timer a is started (step 306). If it has not changed, the operation proceeds to step 308.

Step 308 examines whether during closure of the low-side switch 11e, the current through the low-side switch 11e, that is, the armature current Ib, has changed from negative to positive, that is, from the direction in which current flows into the stator winding 5b to the direction in which current flows out into the low-side DC power terminal (0 V). If the current direction has changed, a built-in timer e is started (step 310). If it has not changed, it is examined whether during closure of the high-side switch 11b, the current through the high-side switch 11b, that is, the armature current Ib, has changed from positive to negative, that is, from the direction in which current flows out of the stator winding 5b into the high-side DC power terminal to the direction in which current flows into the stator winding 5b (step 312). If the current direction has changed, a built-in timer b is started (step 314). If it has not changed, the operation proceeds to step 316.

Step 316 examines whether during closure of the low-side switch 11f, the current through the low-side switch 11f, that is, the armature current Ic, has changed from negative to positive, that is, from the direction in which current flows into the stator winding 5c to the direction in which current flows out into the low-side DC power terminal (0 V). If the current direction has changed, a built-in timer f is started (step 318). If it has not changed, it is examined whether during closure of the high-side switch 11c, the current through the high-side switch 11c, that is, the armature current Ic, has changed from positive to negative, that is, from the direction in which current flows out of the stator winding 5c into the high-side DC power terminal to the direction in which current flows into the stator winding 5c (step 320). If the current direction has changed, a built-in timer c is started (step 322). If it has not changed, the operation proceeds to step 400.

Step 400 examines whether the timer d has timed out, that is, whether a predetermined delay duration $\Delta T = T_2 = T_4$ (see FIGS. 5A–5F) has elapsed. If the timer d has not timed out, the operation immediately proceeds to step 404. If the timer d has timed out, then the low-side switch 11d is turned off, the high-side switch 11a is turned on, and the timer d is reset to 0. The operation then proceeds to step 404.

Step 404 examines whether the timer a has timed out, that is, whether the predetermined delay duration $\Delta T = T_2 = T_4$ has elapsed. If the timer a has not timed out, the operation immediately proceeds to step 408. If the timer a has timed out, then the low-side switch 11d is turned on, the high-side switch 11a is turned off, and the timer a is reset to 0. The operation then proceeds to step 408.

Step 408 examines whether the timer e has timed out, that is, whether the predetermined delay duration $\Delta T = T_2 = T_4$ has elapsed. If the timer e has not timed out, the operation immediately proceeds to step 412. If the timer e has timed out, then the low-side switch 11e is turned off, the high-side switch 11b is turned on, and the timer e is reset to 0. The operation then proceeds to step 412.

Step 412 examines whether the timer b has timed out, that is, whether the predetermined delay duration $\Delta T = T_2 = T_4$ has elapsed. If the timer b has not timed out, the operation immediately proceeds to step 416. If the timer b has timed out, then the low-side switch 11e is turned on, the high-side switch 11b is turned off, and the timer b is reset to 0. The operation then proceeds to step 416.

Step 416 examines whether the timer f has timed out, that is, whether the predetermined delay duration $\Delta T=T_2=T_4$ has elapsed. If the timer f has not timed out, the operation immediately proceeds to step 420. If the timer f has timed out, then the low-side switch 11f is turned off, the high-side switch 11c is turned on, and the timer f is reset to 0. The operation then proceeds to step 420.

Step 420 examines whether the timer c has timed out, that is, whether the predetermined delay duration $\Delta T=T_2=T_4$ has elapsed. If the timer c has not timed out, the operation immediately returns to the main routine (FIG. 7). If the timer c has timed out, then the low-side switch 11f is turned on, the high-side switch 11c is turned off, and the timer c is reset to 0. The operation then returns to the main routine (FIG. 7).

Although according to this embodiment each of the switches 11a–11f is closed for a duration of electric angle of 180°, the closure duration may be less than 180°. In such a case, however, since a duration when both the high-side switch and the low-side switch of the respective phase inverter circuits are turned off occurs, the following control should be performed.

The description will be made in conjunction with, for example, the a-phase. If the phase voltage Va of the stator winding 5a of the a-phase becomes higher than the battery voltage VB during turn-off of both the high-side switch 11a and the low-side switch 11d, the high-side switch 11a is turned on. The high-side switch 11a thus turned on should be turned off after the predetermined delay duration ΔT from when the phase voltage Va becomes lower than the battery voltage VB, as described above.

Similarly, if the phase voltage Va becomes lower than the ground potential during turn-off of both the high-side switch 11a and the low-side switch 11d, the low-side switch 11d will be turned on. The low-side switch 11d thus turned on should be turned off for the predetermined delay duration ΔT after the phase voltage Va becomes higher than the ground potential 0 V, as described above. The control over the b-phase and the c-phase can be performed in the same manner. Alternatively, the element switching operation control described above may be performed only over the a-phase while the control of the switches 11b, 11c, 11e and 11f of the b-phase and c-phase is shifted 120° in timing from the control over the a-phase.

According to this embodiment, since magnetic pole positions can be detected without any specific separate position detector for controlling the advanced-phase current, construction of the apparatus can be simplified.

(Embodiment 2)

FIG. 11 shows a block circuit diagram of an AC generator according to a second embodiment. The generator is generally the same as shown in the block circuit diagram according to Embodiment 1 (see FIG. 1) except that the second embodiment comprises a magnetic pole position detector 16 for detecting the position of the magnetic poles of the rotor 4. This embodiment is also different in that unlike the Si-MOSFETs 11a–11f (FIG. 3), Si-MOSFETs 17a–17f have no low-resistance resistor for detecting current.

According to the second embodiment, the position of the magnetic poles of the rotor 4 is detected by a magnetic pole position detector 16 as indicated in FIG. 11. In FIGS. 12A–12C, tm indicates time point at which an N-pole of the rotor 4 comes to the angle position of the magnetic pole position detector 16, and tm' indicates time point at which an S-pole of the rotor 4 comes to the angle position of the magnetic pole position detector 16. The duration tm-tm' corresponds to an electric angle of 180°.

Therefore, the time point (phase angle) to turn on the Si-MOSFET 17a is determined on the basis of a predetermined phase angle difference δ1 that has been determined with respect to the time point tm and stored. Similarly, the time point (phase angle) to turn on the Si-MOSFET 17d is determined on the basis of the predetermined phase angle difference δ1 with respect to the time point tm'.

Similarly, the time point (phase angle) to turn on the Si-MOSFET 17b is determined on the basis of a predetermined phase angle difference δ2 (=δ1+electric angle of 120°) that has been determined with respect to the time point tm and stored. The time point (phase angle) to turn on the Si-MOSFET 17e is determined on the basis of the predetermined phase angle difference δ2 with respect to the time point tm'.

Similarly, the time point (phase angle) to turn on the Si-MOSFET 17c is determined on the basis of a predetermined phase angle difference δ3 (=δ1−electric angle of 120°) that has been determined with respect to the time point tm and stored. The time point (phase angle) to turn on the Si-MOSFET 17f is determined on the basis of the predetermined phase angle difference δ3 with respect to the time point tm'. According to this embodiment, too, the turn-on duration during which the Si-MOSFETs 17a–17f are turned on is set to an electric angle of about 180°.

Thus, the advancement angle can be precisely determined. The phase advancement control and the non-phase advancement control are performed by controlling the timing of the switching instruction voltage from the regulator 7 to the gate electrode of each of the Si-MOSFETs 17a–17f.

The control according to Embodiment 2 will be described with reference to a flowchart shown in FIG. 13. The control illustrated by the flowchart is carried out by the regulator 7.

Figure 7:
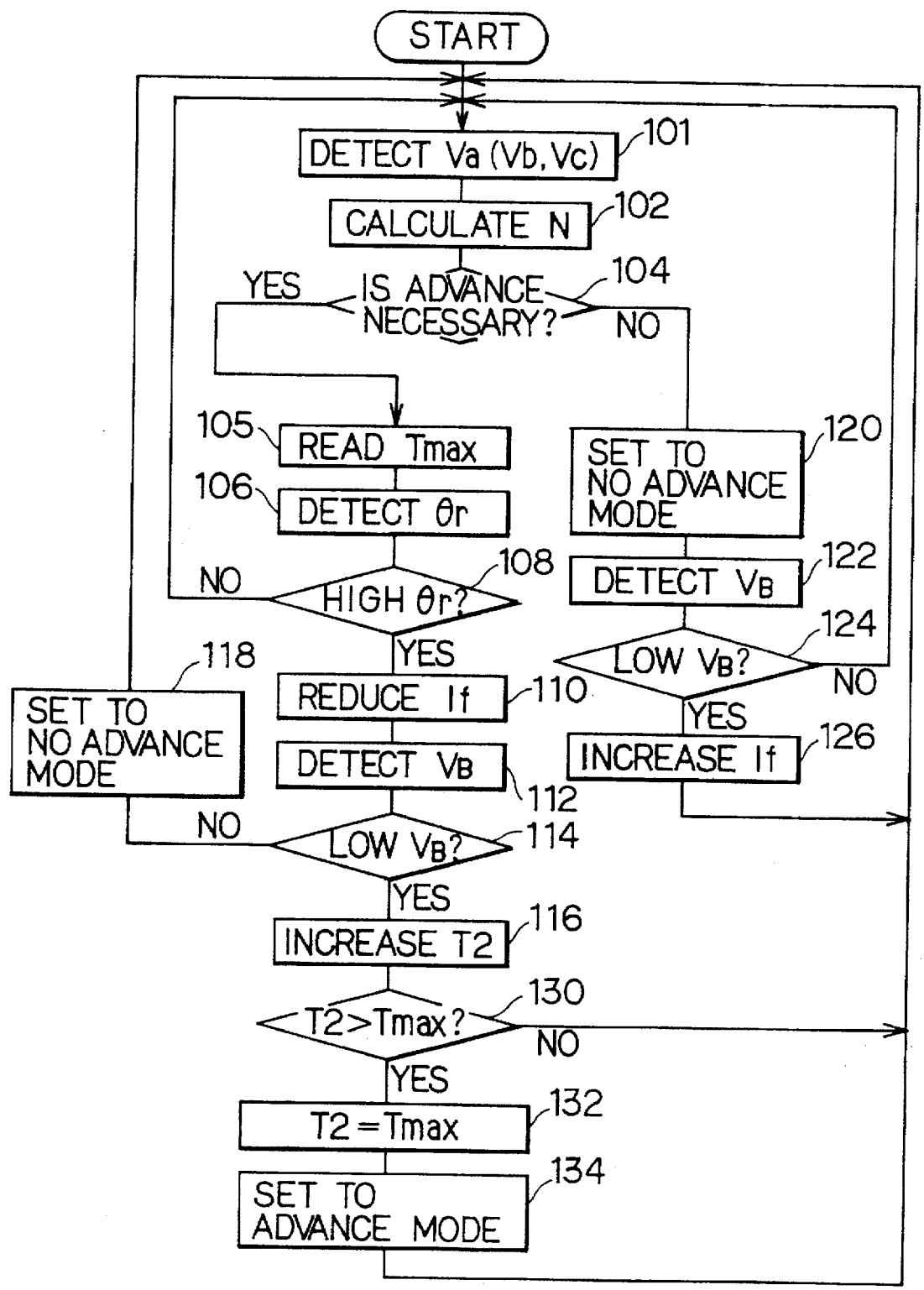
FIG. 7 is a flowchart illustrating a control process according to Embodiment 1.
Figure 8:
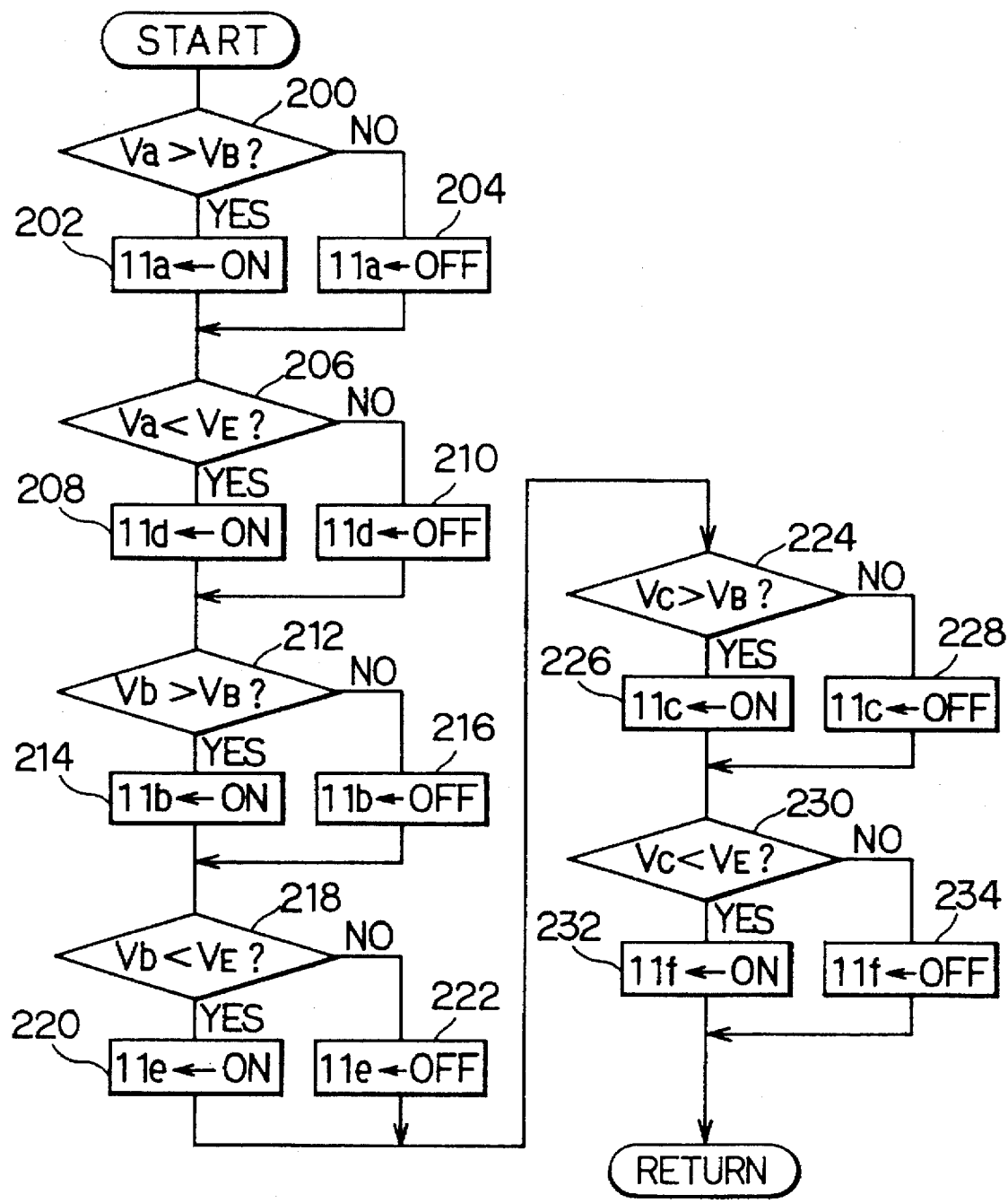
FIG. 8 is a flowchart illustrating a routine for executing the non-phase advancement mode according to Embodiment 1.
Figure 13:
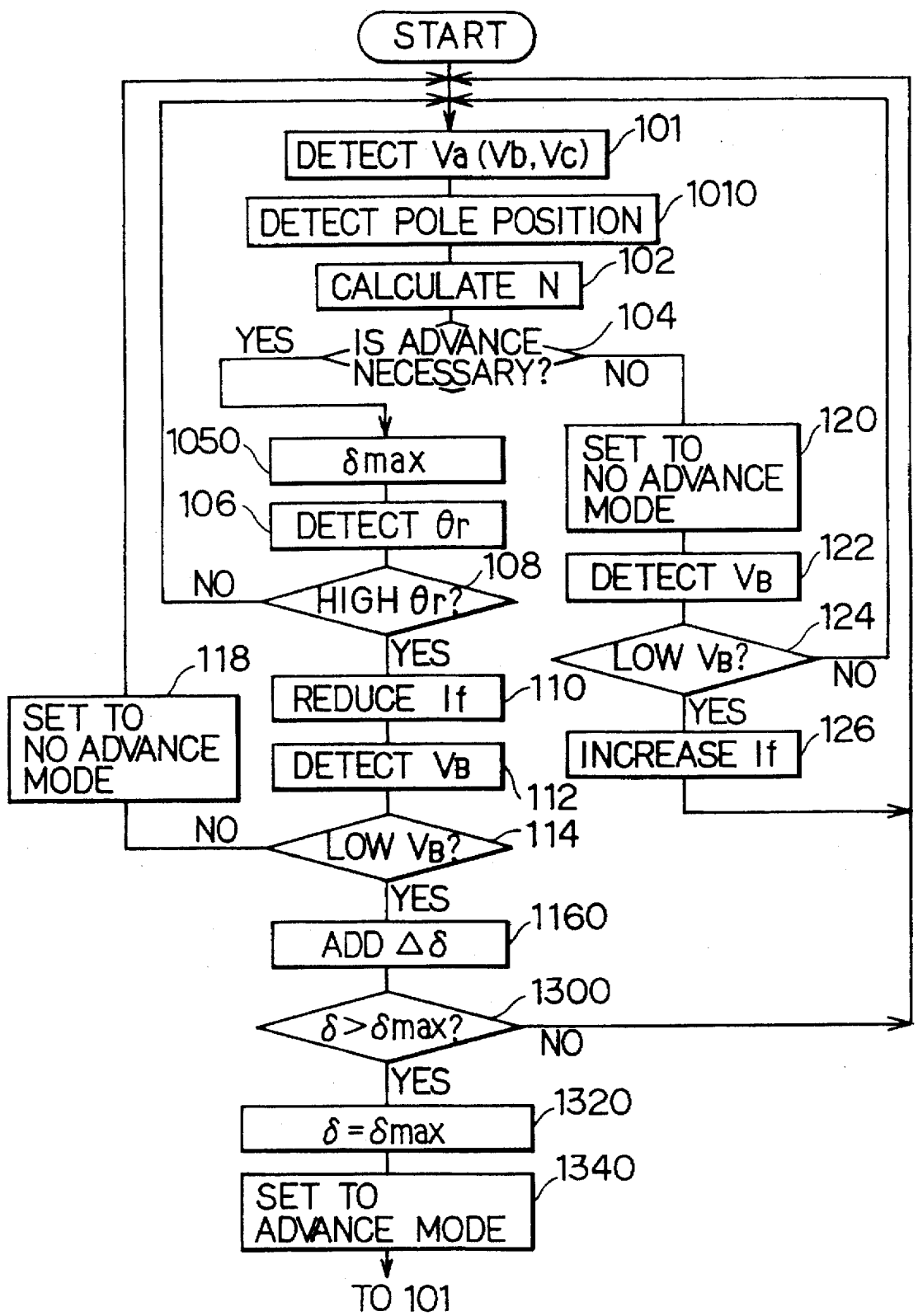
FIG. 13 is a flowchart illustrating a control process according to the Embodiment 2 shown in FIG. 11.

Steps 101–126 in FIG. 13 are the same as those in FIG. 7 and will not be described. Steps 1010–1340, distinguishing the second embodiment, will be described.

After step 1010 reads in an angle signal from the magnetic pole position detector 16, the regulator 7 performs the same processing as illustrated in FIG. 7. If the battery voltage VB is equal to or less than a predetermined value (step 114), the regulator 7 adds a predetermined value Δδ to a predetermined delay angle δ (step 1160) and then proceeds to step 1300. As in Embodiment 1, Embodiment 2 operates the high-side switch and the low-side switch of the same phase in opposite operational relation. In addition, the non-phase advance mode according to this embodiment is performed under δ1=90°.

Step 1050 determines a maximum delay angle δmax based on the rotational speed by using a map.

Step 1300 examines whether the present value of the delay angle δ is greater than the maximum delay angle δmax. If it is not greater, the operation returns to step 101. If δ is greater than δmax, the regulator 7 sets the delay angle δ to the maximum delay angle δmax (step 1320), and sets the phase advancement control mode active (step 1340), and then returns to step 100.

On the other hand, if step 104 determines that the phase advancement control is not needed, the regulator 7 sets the non-phase advancement control mode (a control mode in which the delay angle δ1 is controlled to an electric angle of 90°) active (step 120), and switches to the conventional field current control on the basis of the battery voltage VB (steps 122, 124, 126).

According to Embodiment 2, since the timing of turning on and off the switches 17a–17f is determined in terms of phase angle, the execution of phase advancement mode can be controlled with respect to the phase angle timing. The detailed description of this operation is omitted.

In addition, the ineffective current component of the advanced-phase current is supplied from the battery and recovered to the battery and, therefore, causes no consumption of the battery capacity if heat generation loss is ignored. Furthermore, although according to this embodiment, the turn-on duration of the Si-MOSFETs is set to an electric angle of 180°, it should be apparent that the turn-on duration can be within a range less than the electric angle of 180°.

(Embodiment 3)

Figure 14:
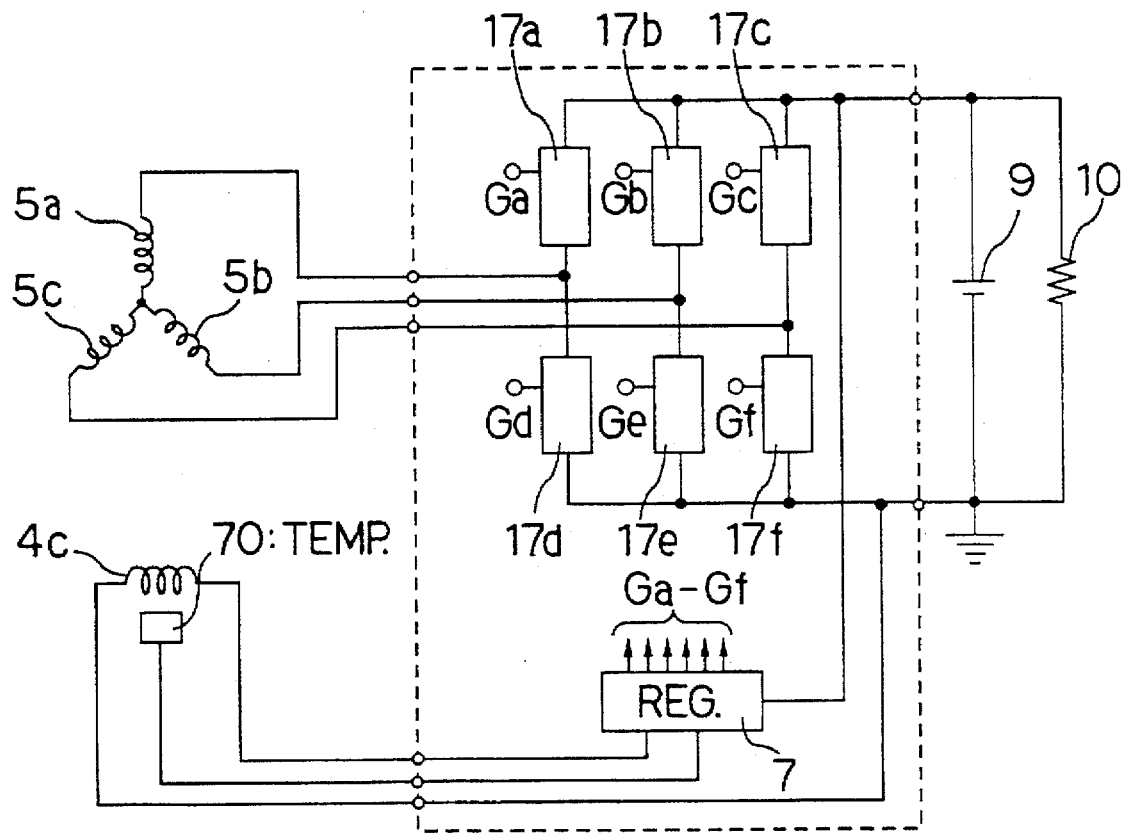
FIG. 14 is a block circuit diagram of a power generating apparatus according to Embodiment 3.

A generating apparatus according this embodiment will be described with reference to FIG. 14. In the apparatus shown in FIG. 14, the MOSFETs 11a–11f of the three-phase full-wave rectifier 11 as shown in FIG. 1 are replaced by the MOSFETs 17a–17f having no low-resistance resistor for detecting current as in Embodiment 2.

This embodiment is distinguished from Embodiment 1 in that the timing of switching the MOSFETs 17a–17f is determined on the basis of the potential difference between the source and the drain of the MOSFETs 17a–17f. The non-phase advancement control is performed by using the method illustrated in FIG. 8. The method of the advanced-phase current control according to this embodiment will be described with reference to FIG. 15 which is similar to the above-described flowcharts of FIGS. 9 and 10. FIG. 15 illustrates a routine for determining a zero crossing point of each armature current according to this embodiment. The operation illustrated in FIG. 15 is the same as the operation illustrated in FIG. 9, except steps 300', 304', 308', 312', 316' and 320'. The routine for controlling the switching operation of the MOSFETs 17a–17f is generally the same as the routine illustrated in FIG. 10.

First, it is examined whether 1 has been set to a flag F2 indicating whether this routine is going to be performed for the first time or has been performed once or more (step 290). If this routine has been performed once or more (F2=1), the operation jumps to step 300. If this routine is going to be performed for the first time (F2=0), only the energization (turning on) of the Si-MOSFETs 17a–17f is performed according to the routine illustrated in FIG. 8 (step 292). After setting the flag F2 to 1 (step 294), the operation proceeds to step 300. The flag F2 is reset to 0 when application of the battery voltage is started.

Step 300' examines whether the voltage Va has become equal to or greater than 0 V during turn-on of the low-side switch 17d to determine whether the current through the low-side switch 17d, that is, the armature current Ia, has changed from negative to positive, that is, from the direction in which current flows into the stator winding 5a to the direction in which current flows out into the low-side DC power terminal (0 V). If the current direction has changed, a built-in timer d is started (step 302). If it has not changed, it is examined whether Va has become equal to or lower than the output voltage VB during turn-on of the high-side switch 17a to determine whether the current through the high-side switch 17a, that is, the armature current Ia, has changed from positive to negative, that is, from the direction in which current flows out of the stator winding 5a into the high-side DC power terminal to the direction in which current flows into the stator winding 5a (step 304'). If the current direction has changed, a built-in timer a is started (step 306). If it has not changed, the operation proceeds to step 308'.

Step 308' examines whether the voltage Vb has become equal to or greater than 0 V during closure of the low-side switch 17e to determine whether the current through the low-side switch 17e, that is, the armature current Ib, has changed from negative to positive, that is, from the direction in which current flows into the stator winding 5b to the direction in which current flows out into the low-side DC power terminal (0 V). If the current direction has changed, a built-in timer e is started (step 310). If it has not changed, it is examined whether Vb has become equal to or lower than the output voltage VB during turn-on of the high-side switch 17b to determine whether the current through the high-side switch 17b, that is, the armature current Ib, has changed from positive to negative, that is, from the direction in which current flows out of the stator winding 5b into the high-side DC power terminal to the direction in which current flows into the stator winding 5b (step 312'). If the current direction has changed, a built-in timer b is started (step 314). If it has not changed, the operation proceeds to step 316'.

Step 316' examines whether the voltage Vc has become equal to or greater than 0 V during closure of the low-side switch 17f to determine whether the current through the low-side switch 17f, that is, the armature current Ic, has changed from negative to positive, that is, from the direction in which current flows into the stator winding 5c to the direction in which current flows out into the low-side DC power terminal (0 V). If the current direction has changed, a built-in timer f is started (step 318). If it has not changed, it is examined whether Vc has become equal to or lower than the output voltage VB during turn-on of the high-side switch 17c to determine whether the current through the high-side switch 17c, that is, the armature current Ic, has changed from positive to negative, that is, from the direction in which current flows out of the stator winding 5c into the high-side DC power terminal to the direction in which current flows into the stator winding 5c (step 320'). If the current direction has changed, a built-in timer c is started (step 322). If it has not changed, the operation proceeds to step 400 in FIG. 10. The operation in step 400 and the following steps is the same as illustrated in FIG. 10.

According to this embodiment, not only is a magnetic pole position detector not needed for the advanced-phase current control, but also MOSFETs do not necessitate a current detecting function.

Although the above-description is made in conjunction with a three-phase synchronous power generator, it should be understood that the power generation technology of the advanced-phase current supply method of this invention may be applied to a multi-phase synchronous generator of more than three phases.

What is claimed is:

1. A synchronous power generating apparatus that generates electric power for charging a battery, the apparatus comprising:

a synchronous power generator having a rotor around which a field winding is wound for forming field magnetic flux and a stator around which stator windings are wound for generating the electric power;

control means for controlling a field current to the field winding to thereby control a power generating state of the synchronous power generator; and rotational speed detecting means for detecting a physical quantity related to rotational speed of the power generator, wherein the control means receives the physical quantity detected by the rotational speed detecting means and includes advanced-phase current supplying means for supplying an advanced-phase current from the battery to the stator windings in a predetermined low rotational speed range when the rotational speed of the power generator is lower than a predetermined speed, the advanced-phase current being advanced in phase with respect to an output voltage of the stator windings and causing field magnetic flux to be formed by both the field winding and the stator windings, the advanced-phase current supplying means reducing the advanced-phase current in a predetermined high rotational speed range when the rotational speed of the power generator is higher than the predetermined speed so that the field magnetic flux is formed mainly by the field winding.

2. A synchronous power generating apparatus according to claim 1, wherein the advanced-phase current supplying means interrupts the advanced-phase current when the rotational speed of the power generator is in the predetermined high rotational speed range.

3. A synchronous power generating apparatus according to claim 1, wherein advanced-phase current supplied by the advanced-phase current supplying means causes an amount of the field current supplied to the field winding to be less when the rotational speed of the power generator is in the predetermined low rotational speed range than when the rotational speed is in the predetermined high rotational speed range.

4. A synchronous power generating apparatus according to claim 1, wherein the rotor of the synchronous power generator has a Lundell-type nail-shaped core.

5. A synchronous power generating apparatus according to claim 1, wherein the advanced-phase current supplying means includes:
   a two-way conduction switching circuit formed of semiconductor switching devices and connected between corresponding output terminals of the stator windings of a plurality of phases and the battery; and
   a control circuit for controlling the two-way conduction switching circuit and for adjusting a conduction period during rectification of the semiconductor switching devices so that the advanced-phase current flows in a direction into the stator windings from the battery via the two-way conduction switching circuit.

6. A synchronous power generating apparatus according to claim 5, wherein the semiconductor switching devices include bi-directional conducting devices.

7. A synchronous power generating apparatus according to claim 5, wherein the semiconductor switching devices include MOSFETs.

8. A synchronous power generating apparatus according to claim 7, wherein the MOSFETs are formed of SiC material.

9. A synchronous power generating apparatus according to claim 5, further comprising:
   phase angle detecting means for detecting a rotational phase angle of the rotor of the synchronous power generator,
   wherein the control circuit of the advanced-phase current supplying means adjusts the conduction period of the semiconductor switching devices on the basis of the rotational phase angle.

10. A synchronous power generating apparatus according to claim 1, wherein the predetermined speed between the predetermined low rotational speed range and the predetermined high rotational speed range is a value from twice to four times as high as a rotational speed of the synchronous power generator at which a voltage generated by the synchronous power generator exceeds a predetermined battery voltage value.

11. A synchronous power generating apparatus according to claim 1, further comprising:

temperature detecting means for detecting a physical quantity related to a temperature of the field winding of the rotor,
   wherein the advanced-phase current supplying means increases the advanced-phase current and reduces the field current when the temperature indicated by the detected physical quantity is higher and lower than a predetermined temperature, respectively.

12. A synchronous power generating apparatus according to claim 11, further comprising:
   temperature determining means for determining whether the temperature detected by the temperature detecting means exceeds a predetermined value;
   the advanced-phase current supplying means supplying the advanced-phase current and reducing the field current when the temperature exceeds the predetermined value; and
   the advanced-phase current supplying means reducing the advanced-phase current when the temperature is less than the predetermined value.

13. A synchronous power generating apparatus according to claim 1, wherein the synchronous power generator has the stator windings of at least three phases.

14. A synchronous power generating apparatus according to claim 5, further comprising:
   current detecting means for detecting a physical quantity related to armature currents,
   wherein the control circuit determines starting time points to start supplying the advanced-phase current to the stator windings and ending time points to end supplying the advanced-phase current to the stator windings on the basis of the detected physical quantity related to the armature currents.

15. A synchronous power generating apparatus according to claim 14, wherein the control circuit turns on and off high-side switches and low-side switches after a predetermined length of time from when an output value of the current detecting means reaches a predetermined value.

16. A magnetization control method for a synchronous power generating apparatus, which controls field current flowing through a field winding of a synchronous power generator to control power generation output from stator windings, the method comprising the steps of:
   detecting a physical quantity related to a rotational speed of the synchronous power generator;
   supplying advanced-phase currents to the stator windings on the basis of the detected rotational speed, the advanced-phase currents being advanced in phase with respect to output voltages of the stator windings, and causing the stator windings to form field magnetic flux in addition to the field magnetic flux formed by the field winding in a predetermined low rotational speed range when the rotational speed of the power generator is lower than a predetermined speed; and
   reducing the advanced-phase currents to the stator windings so that the field magnetic flux is mainly formed by the field winding in a predetermined high rotational speed range when the rotational speed of the power generator is higher than the predetermined speed.

17. A magnetization control method for a synchronous power generating apparatus according to claim 16, wherein the advanced-phase currents supplying step causes an amount of field current flowing through the field winding to be less when the rotational speed of the power generator is in the low operational speed range than when the rotational speed is in the high operational speed range.

18. A synchronous power generating apparatus that generates electric power for charging a DC power source, the apparatus comprising:

a synchronous power generator having a rotor around which a field winding is wound for forming field magnetic flux and a stator around which stator windings are wound for generating the electric power;

a two-way conduction switching circuit including a plurality of high-side switches for connecting a high-level terminal of the DC power source individually to corresponding ones of the stator windings, and a plurality of low-side switches for connecting a low-level terminal of the DC power source individually to corresponding ones of the stator windings;

a control circuit for controlling a switching operation of the high-side switches and the low-side switches so as to control armature currents of the stator windings;

current detecting means for detecting a physical quantity related to the armature currents, wherein the control circuit determines starting time points to start supplying advanced-phase currents to the stator windings and ending time points to end supplying advanced-phase currents to the stator windings on the basis of the physical quantity related to the armature currents, the advanced-phase currents being advanced in phase with respect to output voltages of the stator windings.

19. A synchronous power generating apparatus according to claim 18, wherein the control circuit turns on and off high-side switches and low-side switches after a predetermined length of time from when an output value of the current detecting means reaches a predetermined value.

20. A synchronous power generating apparatus according to claim 19, wherein the control circuit turns off the high-side switches after a predetermined length of time from when the armature currents through the high-side switches shift from flowing in a direction out into the high-level DC power source terminal to flowing in a direction into the stator windings.

21. A synchronous power generating apparatus according to claim 19, wherein the control circuit turns off the low-side switches after a predetermined length of time from when the armature currents through the low-side switches shift from flowing in a direction into the stator windings to flowing in a direction out into the high-level DC power source terminal.

22. A synchronous power generating apparatus according to claim 19, wherein the control circuit turns on the low-side switches at a time point when the armature currents through the high-side switches shift from flowing in a direction out into the high-level DC power source terminal to flowing in a direction into the stator windings, or after a predetermined length of time from the time point.

23. A synchronous power generating apparatus according to claim 19, wherein the control circuit turns on the high-side switches at a time point when the armature currents through the low-side switches shift from flowing in a direction into the stator windings to flowing in a direction out into the high-level DC power source terminal, or after a predetermined length of time from the time point.

24. A synchronous power generating apparatus according to claim 18, wherein:

the high-side switches and the low-side switches include MOSFETs; and the current detecting means include low-resistance devices integrated with the MOSFETs.

25. A synchronous power generating apparatus according to claim 5, wherein the two-way conducting switching circuit includes:

a high-side two-way conduction switching circuit formed of semiconductor switching devices and connected to corresponding output terminals of the stator windings and to a high-side terminal of the battery;

a low-side two-way conduction switching circuit formed of semiconductor switching devices and connected to corresponding output terminals of the stator windings and a low-side of the battery.

* * * * *